INVENTOR.
John J. Preotle

March 9, 1965 J. J. PREOTLE 3,172,925
METHOD OF DISTRIBUTING FOAM FORMING RESIN
WITHIN A SANDWICH STRUCTURE
Filed Aug. 31, 1962 2 Sheets-Sheet 2

INVENTOR.
John J. Preotle
BY
HIS ATTORNEY

United States Patent Office 3,172,925
Patented Mar. 9, 1965

3,172,925
METHOD OF DISTRIBUTING FOAM FORMING RESIN WITHIN A SANDWICH STRUCTURE
John J. Preotle, Dayton, Ohio, assignor to General Motors Corporation, Detroit, Mich., a corporation of Delaware
Filed Aug. 31, 1962, Ser. No. 220,725
2 Claims. (Cl. 264—45)

This invention pertains to the insulation of the insulating spaces of refrigerator cabinets.

It has been customary in the past to fill the insulation spaces of refrigerator cabinets with large bats of glass fibers or rock wool. Recently, more effective insulation has been provided by plastic resin foams containing an insulating gas. Difficulty has been encountered in distributing the materials forming such foams in such a way that all parts of the insulation spaces are filled with the foam resin at a substantially constant, low density without tearing or rupture of the gas cells containing the insulating gas.

It is an object of this invention to provide an improved method of distributing insulating materials forcibly by flinging the materials laterally within the space to be insulated.

It is another object of this invention to provide an improved method of distributing material capable of forming plastic resin containing an insulating gas by forcibly flinging the materials laterally within the space to be insulated.

It is another object of this invention to add a flinger at the outlet of a foam plastic resin mixer which flinger is rotated by an extension of the mixer shaft and which flinger flings the mixed resin laterally.

These and other objects are attained using the apparatus and the process shown in the drawings in which the two polyurethane components, such as the component containing the hydroxyl bearing polyol surfactant and catalyst hereinafter referred to as master batch and the isocyanate bearing component, are circulated in separate systems and metered into a mixing chamber in stoichiometric ratio. One of the components also contains a volatile liquid which forms the insulation gas and accomplishes the foaming of the resin. According to my invention, the mixer shaft is provided with an extension which is threaded into a flinger having radially extending blades which operates at the same high speed as the mixer. As the mixture is discharged from the mixing chamber, it engages the blades of the flinger which causes the mixed material to be centrifugally flung laterally in a widely distributed pattern so that it extends to and is distributed to all portions of the insulation space.

Further objects and advantages of the present invention will be apparent from the following description, reference being had to the accompanying drawings wherein a preferred embodiment of the present invention is clearly shown.

Figure 1:
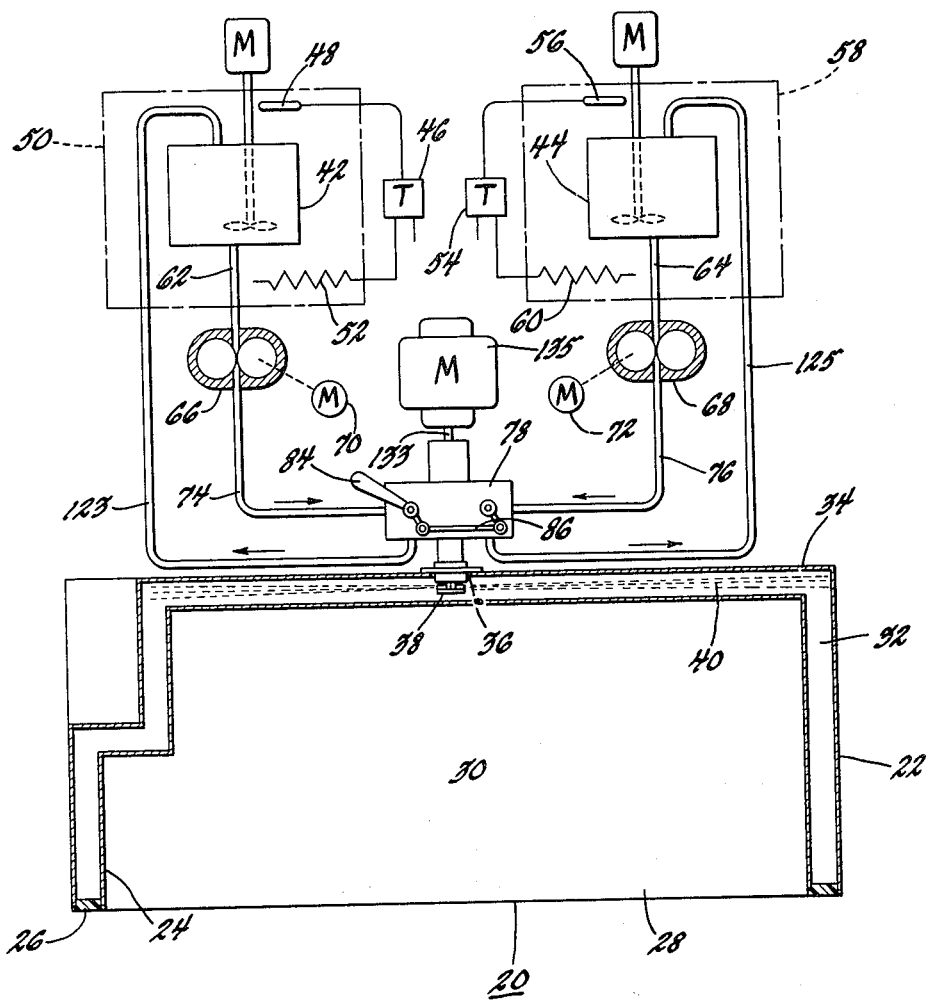
FIGURE 1 is a sectional view, partly diagrammatic, of a hollow refrigerator cabinet shell containing connected insulation spaces in its walls located with the back facing upward and having an aperture therein through which extends the flinger of a mixing apparatus embodying one form of my invention.

Referring now to the drawing and more particularly to FIGURE 1, there is shown a refrigerator cabinet shell 20 including an outer sheet metal shell 22 and an inner sheet metal liner 24 which are connected together by a plastic breaker strip 26 extending around and bordering the open side 28 of the storage compartment 30. Between the outer shell 22 and the inner liner 24, there is provided the insulation space 32 which extends continuously over the back, the sides, top and bottom of the cabinet 20.

According to my invention, the back wall 34 of the outer shell 22 is provided with a substantially centrally located filler opening 36 which is large enough to admit the flinger 38. The foam-forming materials issue from the supply and mixing apparatus through the aperture 36 and impinge upon the radially impelling flinger 38 which is rotated at high speed, such as 18,000 r.p.m., so that the materials are flung radially in a pattern indicated by the dotted lines 40 to the portions of the insulation space 32 forming the sides, top and bottom of the cabinet 20. The foam-forming materials, after being distributed to these portions of the insulation space and after they have foamed to fill these spaces, then fill the portions of the insulation space 32 in the rear wall until the entire insulation space 32 is filled.

As one specific example of my invention, the two separate polyurethane components may be provided in the supply tanks 42 and 44. The tank 42 may be provided with the component containing the hydroxyl bearing polyol surfactant and catalyst hereafter referred to as master batch while the tank 44 may be provided with the isocyanate bearing component.

More specifically, the tank 42 is supplied with a mixture of 30 parts of polyether C to 29.5 parts of activator mixture I. The tank 42 is preferably kept at a temperature of about 110° F. by the control provided by the thermostatic control 46 having a thermostat bulb 48 located within the insulated enclosure 50 surrounding the tank 42. The thermostatic control 46 controls the temperature-modifying means 52 which may be either a heating means or a refrigerating means or both. The tank 44 is charged with a mixture of 100 parts of prepolymer F to 20 parts of trifluoromonochloromethane (Freon 11) and is kept at a temperature of about 50° F. by the thermostatic control 54 provided with a thermostat bulb 56 within the insulated enclosure 58 for the purpose of controlling the temperature-modifying means 60 which may be in the form of a refrigerating means or a heating means or both. The prepolymer F is composed of 75 parts of polyisocyanate ingredient A and 25 parts of polyether C. The isocyanate ingredient A is composed of 80 parts of 2,4 diisocyanate and 20 parts of 2,6 diisocyanate. The polyether C contains 1 mol of sorbitol and 10 mols of propylene oxide. It has an OH number of 495, an acid number of .30 and a viscosity (cps.) at 83° F. of 7500. Water by weight is .1 mol. The activator mixture I expressed in parts by weight includes 26 parts of N,N,N',N', tetrakis (2-hydroxypropyl) ethylene diamine, 3 parts triethylene diamine, and .5 part emulsifier made up of 90% propylene glycol and 10% polyethylene glycol. All parts are determined by weight except where otherwise indicated.

The polyurethane components are withdrawn from the supply tanks 42 and 44 through the conduits 62 and 64 in proportions by weight of 59.5 parts from the tank 42 and 120 parts from the tank 44 by the pumps 66 and 68 which are individually driven by the motors 70 and 72 in the proper ratio. The pumps 66 and 68 pump the two polyurethane components through the conduits 74 and 76 to the valve block 78. The valve block 78 is provided with two parallel plug valves 80 and 82 controlled by the handle 84 and the link connection 86 to provide for simultaneous delivery through the passages 88, 90, 92 and 94 into the mixing chamber 96 or for simultaneous recirculation through the passages 98 and 121 to the recirculating pipes 123 and 125 which return the two components to their respective supply tanks 42 and 44. The mixing chamber 96 is enclosed by a flanged sleeve 127 which threads into the valve block 78. The valve block 78 is provided with an upper ball bearing 129 and a lower ball bearing 131 which support the agitator or mixer shaft 133 driven by the electric motor 135 at a very high speed, such as 18,000 r.p.m. The mixer or agitator shaft 133 is provided with two sets of projecting pins 137 and 139 within the mixing chamber 96 for mixing or agitating the two components therein.

Figure 2:
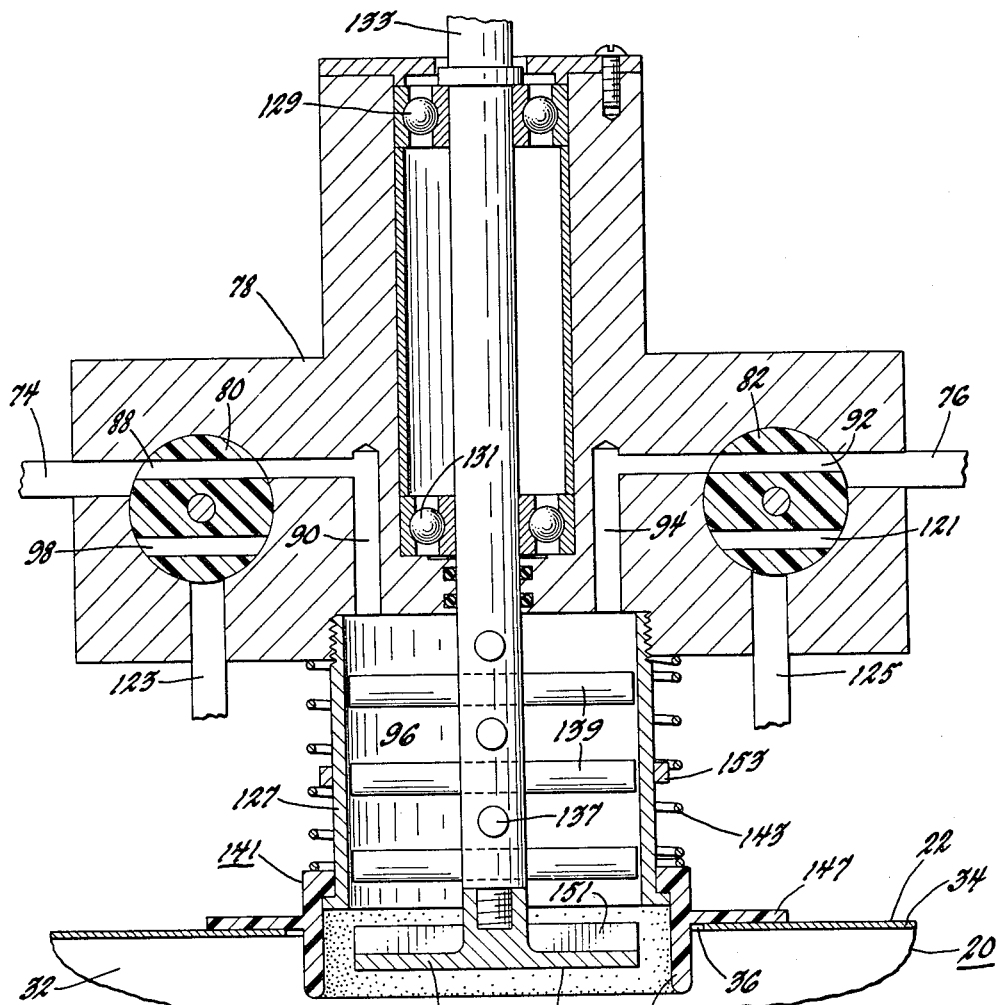
FIGURE 2 is an enlarged sectional view of the flinger and mixing apparatus shown in FIGURE 1 in a position preliminary to the supply of the material to the insulation space.
Figure 3:
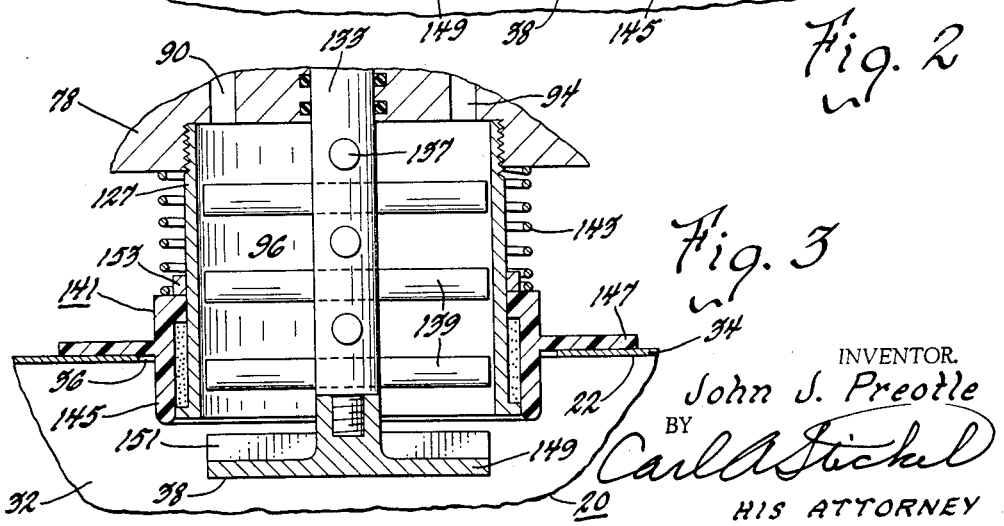
FIGURE 3 is a fragmentary sectional view similar to FIGURE 2 showing the finger and apparatus positioned for delivery of the material to the insulation space.

As mentioned before, the flinger 38 is threaded onto the bottom of this motor-driven agitator or mixer shaft 133. It includes a circular bottom plate or disk 149 having integral vertical ribs or blades 151 extending upwardly therefrom radially outwardly from the hub at the lower end of the mixer shaft 133. The mixer housing 127 has slidably mounted thereon a guard 141 having an upper inwardly turned flange forming the sliding portion upon the housing 127. The bottom of the housing 127 is provided with an outwardly turned flange which is adapted to guide the guard 141 and to engage the inwardly turned flange as shown in FIGURE 2 to limit the outward movement of the guard 141. The guard 141 is normally lightly pressed outwardly by the coil spring 143. The guard 141 is provided with a projecting cylindrical portion 145 which surrounds the flinger 38 when the guard is in its outermost position shown in FIGURE 2 so as to prevent any indiscriminant flinging of the foam-forming material from the flinger 38 should there be any failure to shut off soon enough the supply of polyurethane components to the mixing chamber 96 when the flinger 38 is removed or not properly inserted in the insulation space 32. The guard 141 is provided with a circular flange 147 adapted to complete the cover for the aperture 36 through which the flinger 38 and the cylindrical portion 145 extend. When the apparatus is pushed in sufficiently far, the guard 141 will be moved toward the valve housing 78 as illustrated in FIGURE 3 to uncover the periphery of the flinger 38 so that the flinger 38 can fling the polyurethane components laterally within the insulation space 32. The mixer housing 127 is provided with a stop ring 153 to limit the upward movement of the guard 141 relative to the mixer housing 127.

With the flinger 38 being inserted into the insulation space through the aperture 36, upon operation of the handle 84 to delivery position, the polyurethane components mixed in the chamber 96 and delivered to the flinger 38 will be flung out by the flinger 38 radially so that they are directed first to the portions of the insulation space 32 farthest from the filler aperture 36. The foam-forming materials 40 therefore build up first in the furthest portions of the insulation space namely the side, top and bottom portions after which the space in the back wall is gradually filled progressively closer to the filler aperture 36 to provide a more uniform and lower density insulation with higher insulating qualities without tearing or rupturing the cells containing the insulating gas. When sufficient components are flung into the insulation space 32 by the flinger 38, the flinger 38 and the mixing chamber 127 are withdrawn from the aperture 36 and the foaming of the components is allowed to proceed to completion and completely fill the insulation space 32. At the conclusion of the foaming and curing operations, the aperture 36 may be provided with a cover if desired.

While the embodiment of the present invention as herein disclosed, constitutes a preferred form, it is to be understood that other forms might be adopted.

What is claimed is as follows:

1. The process of distributing foam forming resin material between extensive substantially parallel and substantially horizontal walls spaced close together having downwardly extending spaced walls connecting at the edges of said horizontal walls which includes passing the foam forming resin material through a substantially centrally located aperture in one of said horizontal walls and centrifugally impelling said resin material horizontally between said horizontal walls to said downwardly extending spaced walls at a sufficiently high speed to prevent any substantial impingement upon said horizontal walls before it reaches said downwardly extending spaced walls.

2. The process of distributing foam forming resin material between extensive substantially parallel and substantially horizontal walls spaced close together having downwardly extending spaced walls connecting at the edges of said horizontal walls which includes inserting a rotatable radially impelling flinger through a substantially centrally located aperture in one of said horizontal walls and passing the foam forming resin material through said aperture into impingement with said flinger and rotating said flinger at a sufficiently high speed to fling said resin material horizontally between said horizontal walls to said downwardly extending spaced walls without any substantial impingement of said resin material with said horizontal walls.

References Cited in the file of this patent

UNITED STATES PATENTS

| | | |
|---|---|---|
| 702,736 | Madden | June 17, 1902 |
| 1,294,909 | Howell | Feb. 18, 1919 |
| 2,026,624 | Flower | Jan. 7, 1936 |
| 2,653,139 | Sterling | Sept. 22, 1953 |
| 2,863,493 | Snow et al. | Dec. 9, 1958 |
| 2,870,054 | Amos et al. | Jan. 20, 1959 |
| 2,880,456 | Kuzella et al. | Apr. 7, 1959 |
| 2,907,627 | Cummings | Oct. 6, 1959 |
| 2,962,183 | Rill et al. | Nov. 29, 1960 |
| 2,983,963 | Jodell et al. | May 16, 1961 |
| 2,993,233 | Hoppe et al. | July 25, 1961 |
| 2,994,110 | Hardy | Aug. 1, 1961 |
| 3,029,027 | Gray | Apr. 10, 1962 |
| 3,046,177 | Hankins et al. | July 24, 1962 |
| 3,081,487 | Heffner et al. | Mar. 19, 1963 |

OTHER REFERENCES

Chemical Progress (Union Carbide), vol. 8, No. 7, July 1962, "Rigid Foam Polyol Capacity Increased Ten-Fold," pp. 4-5.